United States Patent
Capps et al.

(10) Patent No.: US 7,283,514 B2
(45) Date of Patent: Oct. 16, 2007

(54) PROGRAMMABLE NETWORK-DTE INTERFACE CONTAINING SELECTIVELY ENABLED T1/E1 FRAMED, DATA PUMP AND MICROPROCESSOR

(75) Inventors: Charles David Capps, Huntsville, AL (US); Clarke Edgar Moore, Huntsville, AL (US); Dwight Edwin Wright, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 1127 days.

(21) Appl. No.: 10/338,445

(22) Filed: Jan. 8, 2003

(65) Prior Publication Data

US 2004/0131049 A1 Jul. 8, 2004

(51) Int. Cl.
*H04L 12/66* (2006.01)

(52) U.S. Cl. .................................. 370/352; 370/463

(58) Field of Classification Search ............... 370/352, 370/354, 463; 379/93.05, 93.06, 93.07
See application file for complete search history.

(56) References Cited

U.S. PATENT DOCUMENTS 6,483,902 B1* 11/2002 Stewart et al. ........... 379/90.01
6,895,016 B1*  5/2005 Nguyen et al. ............. 370/437

* cited by examiner

*Primary Examiner*—Stella Woo
(74) *Attorney, Agent, or Firm*—Allen, Dyer, Doppelt, Milbrath & Gilchrist, P.A.

(57) ABSTRACT

A programmable network-DTE interface integrates T1/E1 framer, data pump and microprocessor components into a common subsystem chip architecture, and interfaces each of these components by means of a user programmable multiplexing subsystem, so as to allow any of the functional blocks of the architecture to be selectively enabled or disabled/by-passed by the user.

15 Claims, 1 Drawing Sheet

PROGRAMMABLE NETWORK-DTE INTERFACE CONTAINING SELECTIVELY ENABLED T1/E1 FRAMED, DATA PUMP AND MICROPROCESSOR

FIELD OF THE INVENTION

The present invention relates in general to communication systems and subsystems therefor, and is particularly directed to a new and improved digital telecommunication apparatus containing T1/E1 framer, data pump and microprocessor components that are interconnected in a common integrated circuit chip by means of a user programmable multiplexing subsystem, which allows any of the functional blocks of the architecture to be selectively enabled or disabled by the user.

BACKGROUND OF THE INVENTION

Manufacturers of telecommunication equipment for interfacing a digital communication network with an end user's data terminal equipment (DTE) customarily offer a digital communication arrangement of the type shown in FIG. 1. This arrangement contains a digital telecommunication network-terminating (T1/E1) framer 10, a data pump 20 which interfaces with the framer and connects to the customer's data terminal equipment, and a control processor 30, which controls the operation of the framer and the data pump. Because the high price of the framer chip is inordinately high, manufacturers of DTE subsystem equipment have been unable to offer their customers subsystem arrangements that might otherwise provide greater versatility and selective functionality, without entailing a substantial cost burden (associated with the sole source of the framer chip).

SUMMARY OF THE INVENTION

In accordance with the present invention, the above-discussed limitations of such subsystem equipment that derive from the high cost of the framer chip are effectively obviated by a new and improved programmable network-DTE interface, which integrates the T1/E1 framer, data pump and microprocessor components into a common subsystem chip architecture, and interfaces each of these components by means of a user programmable multiplexing subsystem, so as to allow any of the functional blocks of the architecture to be selectively enabled or disabled/by-passed by the user.

As will be described, each of the framer, data pump and microprocessor may be implemented in a common integrated gate array architecture, preferably a digital ASIC chip. Significantly reducing the cost of implementation of the network-DTE interface allows additional functionality to be added without substantially increasing the price of the chip. Pursuant to the invention, a communication path multiplexer is installed between the framer and the data pump, and a control bus multiplexer is installed between the microprocessor and the address, data, control bus. Path selectivity through the respective multiplexers is externally programmable via associated select input pins, so as to provide the user with ability to selectively employ some or all of the functionality of the components of the interface.

The communication path multiplexer has a pair of auxiliary ports which provide alternative external connectivity to respective auxiliary signaling paths when the multiplexer is programmed to by-pass the framer and/or the data pump. Where the connection from the framer to the data pump is to be interrupted, the communication path multiplexer may interrupt connectivity with the framer or it may couple the framer to either auxiliary port. Connectivity with the data pump may be interrupted by selectively opening the data pump port or providing connectivity from the data pump to either of the auxiliary ports. Two auxiliary ports provides the communication path multiplexer with the ability to selectively steer each of the framer and the data pump to individual digital communication paths, so that each of the framer and data pump may operate autonomously of the other.

The control bus multiplexer has a first bidirectional signaling port coupled to the microprocessor, a second port coupled to the control bus, and a third port coupled to a bus through which auxiliary control of the control bus may be externally supplied. Like the communication path multiplexer, path selectivity through the control bus multiplexer between the control bus and either the internal processor or the auxiliary path is externally programmable via a set of select pins.

DETAILED DESCRIPTION

Figure 1:
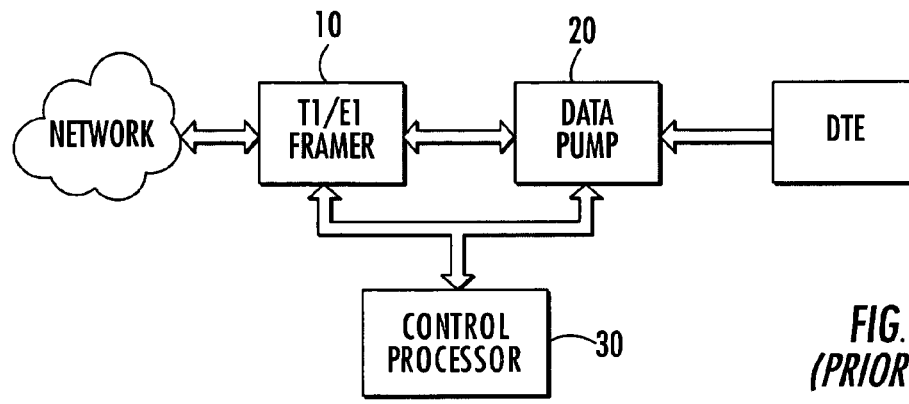
FIG. 1 diagrammatically illustrates a conventional telecommunication equipment arrangement for interfacing a digital communication network and an end user's data terminal equipment.

Before detailing the selectively programmable, network-DTE interface according to the present invention, it should be observed that the invention resides primarily in a prescribed arrangement of conventional digital communication circuits and components, and associated microprocessor, and application software therefor, that controls the operations of such circuits and components. In a practical implementation, the invention may be readily constructed of a digital application specific integrated circuit (ASIC) chip. Consequently, in the drawings, the configuration of such circuits and components, and the manner in which they may be interfaced with various telecommunication circuits have, for the most part, been illustrated by readily understandable block diagrams, which show only those specific details that are pertinent to the present invention, so as not to obscure the disclosure with details which will be readily apparent to those skilled in the art having the benefit of the description herein. Thus, the block diagrams of the Figures are primarily intended to show the various components of the invention in convenient functional groupings, so that the present invention may be more readily understood.

Figure 2:
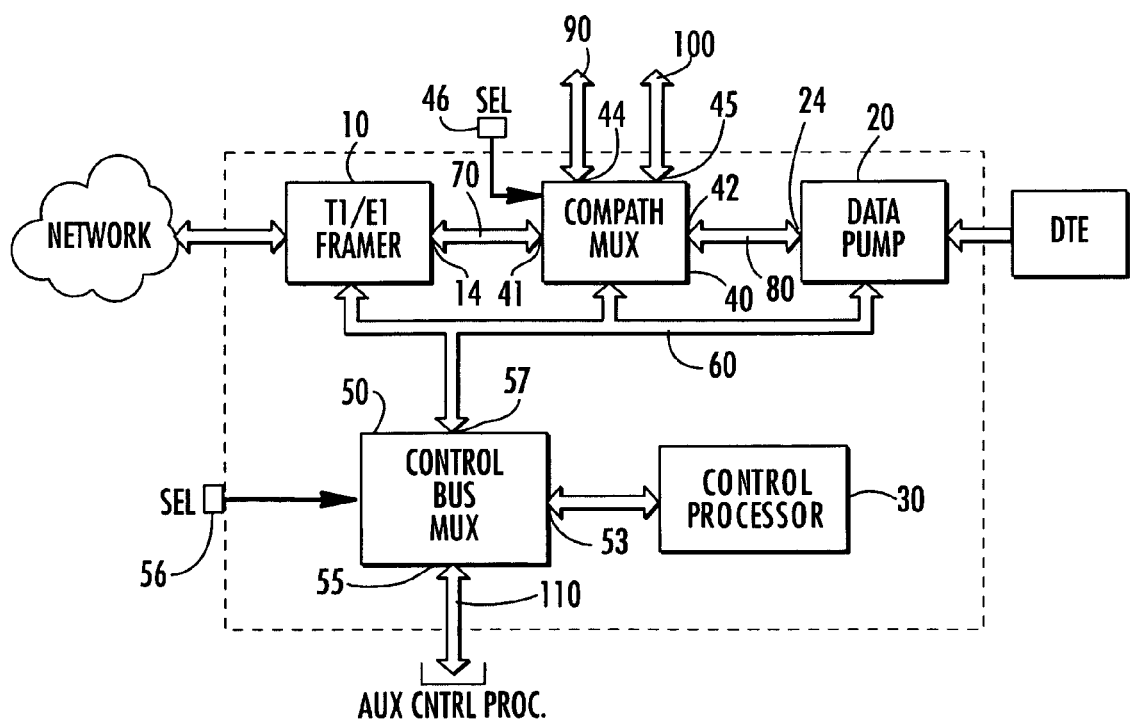
FIG. 2 diagrammatically illustrates the architecture of the selectively programmable, network-DTE interface according to the present invention.

Attention is now directed to FIG. 2, which diagrammatically illustrates the overall architecture of a non-limiting, but preferred, embodiment of the selectively programmable, network-DTE interface according to the present invention. The selectively programmable, network-DTE interface of FIG. 2 contains a T1/E1 framer 10, a data pump 20, and a control processor 30, each of which conforms with industry standard design and performance requirements of the components of the network-DTE interface of FIG. 1. While each of these components (including the costly framer chip) could be purchased separately from current suppliers, doing so would be counterproductive to one of the objectives of the present invention-providing a reasonably priced programmable network-DTE interface, that can be programmed by the user to use some or all of the available functionality of its various operational blocks.

In accordance with the invention, each of the T1/E1 framer 10, data pump 20 and microprocessor 30 is implemented in a common integrated gate array architecture, preferably a reasonably priced digital ASIC chip, as described above. Doing so accomplishes two objectives. First, it drastically reduces the price of the overall network-DTE interface, owing principally to not having to purchase the overpriced framer chip. (It should be noted that the current selling price of the framer chip by the sole source of this part is nearly an order of magnitude greater than the actual cost of its manufacture, and that implementing each of the framer, data pump and microprocessor in a digital ASIC chip can be achieved at only a fraction of the current price of the framer.)

Secondly, the significantly reduced price of the interface allows for the incorporation of additional functionality without substantially increasing the price of the overall chip. In accordance with the invention, this additional functionality comprises a set of multiplexers, including a communication path multiplexer 40 installed between the framer 10 and the data pump 20, and a control bus multiplexer 50 installed between the microprocessor 30 and the address, data, control bus 60, through which the operations of the framer and data pump are normally controlled by the microprocessor 30. The multiplexers themselves being part of the relatively inexpensive gate array are of conventional configuration and provide bidirectional connectivity between their signaling ports. Path selectivity through the respective multiplexers is externally programmable via a set of select pins, so as to provide the user with ability to selectively employ some or all of the functionality of the components of the interface.

More particularly, communication path multiplexer 40 has a first bidirectional signal port 41 coupled over a bidirectional digital data link 70 to bidirectional signaling port 14 of framer 10 (which would normally be coupled directly to bidirectional signaling port 24 of the data pump 20). To provide connection with the data pump 20, communication path multiplexer 40 has a second bidirectional signal port 42 coupled over a bidirectional digital data link 80 to bidirectional signaling port 24 of the data pump 20. Communication path multiplexer 40 further includes a pair of auxiliary ports 43 and 44, which provide alternative external connectivity to respective auxiliary signaling paths 90 and 100, when the multiplexer 40 is programmed to bypass the framer 10 and/or the data pump 20.

Where the connection from the framer to the data pump is to be interrupted, a set of select pins 46 are placed in a prescribed (framer data pump-bypass) logical state. Depending upon the voltage values (e.g., ground or +V) applied to selected ones of the select pins 46, the multiplexer 40 may decouple or interrupt connectivity with framer port 41, or it may couple framer port 41 to either of auxiliary ports 44 and 45, so as to selectively provide framer connectivity to one of the auxiliary paths 90 and 100. In a similar manner, connectivity with the data pump 20 may be interrupted by selectively opening data pump port 42, or providing connectivity from the data pump port 42 to either of auxiliary ports 44 and 45, and thereby selectively enabling data pump connectivity to one of the auxiliary paths 90 and 100. The two auxiliary ports 44 and 45 provides the communication path multiplexer 40 with the ability to selectively steer each of the framer 10 and data pump 20 to respectively targeted external digital communication paths, so that each of the framer and data pump may operate autonomously of the other.

In addition to allowing each of the framer 10 and data pump 20 to be selectively by-passed via the communication path multiplexer 40, the programmable network-DTE interface of FIG. 2 provides the user with the ability to selectively externally control the operation of the chip, through a control bus multiplexer 50 installed between the control processor 30 and the control bus 60. For this purpose, the control bus multiplexer 50 has a first bidirectional signaling port 53 coupled to the microprocessor 30, a second port 57 coupled to the control bus 60, and a third port 55 coupled to a bus 110, through which auxiliary control of the control bus 60 may be externally supplied. Like the communication path multiplexer 40, path selectivity through the control bus multiplexer 50 between control bus 60 and either internal processor 30 or the auxiliary path 110 is externally programmable via a set of select pins 56.

As will be appreciated from the foregoing description, framer chip cost-based limitations of conventional telecommunication equipment for interfacing a digital communication network with an end user's data terminal equipment are effectively obviated by a programmable network-DTE interface, which not only integrates the T1/E1 framer, data pump and microprocessor components into a cost effective digital ASIC chip, but augments this basic architecture with a user programmable multiplexing subsystem, that enables any of the functional blocks to be selectively enabled or disabled/by-passed by the user.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed

1. A digital telecommunication apparatus comprising:
a network port configured to be interfaced with a digital communication network;
a data terminal equipment port configured to be interfaced with data terminal equipment;
a framer and a data pump coupled in a digital communication path between said network port and said data terminal equipment port, and being operative to provide digital telecommunication connectivity between said digital telecommunication network and said data terminal equipment respectively coupled thereto;
a control processor which controls the operation of said framer and said data pump via a control bus coupled thereto; and
a communication path multiplexer, coupled with said digital communication path and being operative to selectively route at least one of communication signals passing through said framer over a path other than one including said data pump, and communication signals passing through said data pump over a path other than one including said framer.

2. The digital telecommunication apparatus according to claim 1, wherein said communication path multiplexer is controllably operative to route communication signals passing through said framer over a path including said data pump.

3. The digital telecommunication apparatus according to claim 1, wherein said framer, data pump and communication path multiplexer are implemented in a common digital application specific integrated circuit chip.

4. The digital telecommunication apparatus according to claim 1, wherein said communication path multiplexer is controllably operative to route communication signals passing through said framer to an external path by-passing said data pump.

5. The digital telecommunication apparatus according to claim 1, wherein said communication path multiplexer is controllably operative to route communication signals passing into said data pump to an external path by-passing said framer.

6. The digital telecommunication apparatus according to claim 1, further including a control bus multiplexer, coupled with said control bus, and being operative to selectively couple said control bus with one of said control processor and an auxiliary control bus port, through which external control signals for controlling the operation of said framer and said data pump are supplied.

7. The digital telecommunication apparatus according to claim 6, wherein said framer, said data pump, said communication path multiplexer, said control bus multiplexer and said control processor are integrated together in a common semiconductor chip.

8. A method of interfacing digital telecommunication between a digital communication network and data terminal equipment comprising the steps of:
   (a) coupling, in a digital communication path between a network port and a data terminal equipment port, a framer and a data pump which, in a prescribed state of interconnectivity therebetween, interface digital telecommunication signals between said digital telecommunication network and said data terminal equipment; and
   (b) modifying said prescribed state of interconnectivity between said framer and said data pump, and selectively routing at least one of communication signals passing through said framer over a digital communication path other than one including said data pump, and communication signals passing through said data pump over a digital communication path other than one including said framer.

9. The method according to claim 8, wherein step (b) comprises controllably routing communication signals passing through said framer to an external path by-passing said data pump.

10. The method according to claim 8, wherein step (b) comprises controllably routing communication signals passing through said data pump to an external path by-passing said framer.

11. The method according to claim 8, further including the steps of:
   (c) providing a control processor which controls the operation of said framer and said data pump via a control bus coupled thereto; and
   (d) coupling a control bus multiplexer to said control bus and said control processor, and controllably causing said control bus multiplexer to selectively couple said control bus with one of said control processor and an auxiliary control bus port, through which external control signals for controlling the operation of said framer and said data pump are supplied.

12. A digital telecommunication device comprising a framer, a communication path multiplexer and a data pump integrated in a common digital application specific integrated circuit chip, said framer and said data pump being coupled in a digital communication path containing said communication path multiplexer between a network port that is interfacable with a digital communication network, and a data terminal equipment port that is interfacable with data terminal equipment, said communication path multiplexer being operative to selectively route communication signals passing through said framer over a path including said data pump, and to selectively route at least one of communication signals passing through said framer over a path other than one including said data pump, and communication signals passing through said data pump over a path other than one including said framer, and a control processor which controls the operation of said framer and said data pump via a control bus coupled thereto.

13. The digital telecommunication device according to claim 12, wherein said communication path multiplexer is controllably operative to route communication signals passing through said framer to an external path by-passing said data pump.

14. The digital telecommunication device according to claim 12, wherein said communication path multiplexer is controllably operative to route communication signals passing into said data pump to an external path by-passing said framer.

15. The digital telecommunication device according to claim 12, further including a control bus multiplexer, coupled with said control bus, and being operative to selectively couple said control bus with one of said control processor and an auxiliary control bus port, through which external control signals for controlling the operation of said framer and said data pump are supplied.

* * * * *